Figure 1:
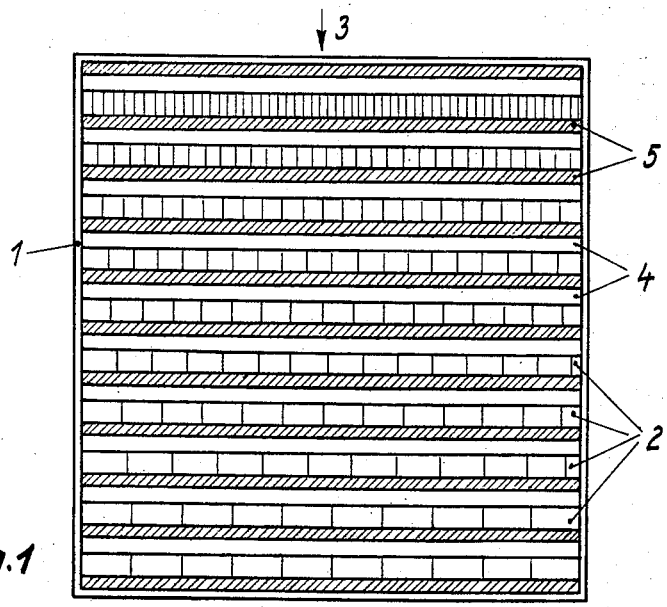

July 22, 1958  JOSEF-HEINRICH HARTMANN  2,844,732
PRODUCING PLURAL PHOTOGRAPHIC IMAGES IN ONE EXPOSURE
Filed March 27, 1956  2 Sheets-Sheet 1

Inventor:
Josef-Heinrich Hartmann
By
Atty

July 22, 1958   JOSEF-HEINRICH HARTMANN   2,844,732
PRODUCING PLURAL PHOTOGRAPHIC IMAGES IN ONE EXPOSURE
Filed March 27, 1956                                         2 Sheets-Sheet 2

Inventor.
Josef-Heinrich Hartmann.
By
Atty.

United States Patent Office 2,844,732
Patented July 22, 1958

2,844,732

PRODUCING PLURAL PHOTOGRAPHIC IMAGES IN ONE EXPOSURE

Josef-Heinrich Hartmann, Erlangen, Germany, assignor to Siemens-Reiniger-Werke Aktiengesellschaft, Erlangen, Germany, a corporation of Germany Application March 27, 1956, Serial No. 574,227

Claims priority, application Germany April 9, 1955

21 Claims. (Cl. 250—65)

This invention is concerned with an arrangement for producing a plurality of photographic images in one exposure.

The invention proposes to arrange a plurality of light sensitive layers, one in back of the other, especially photographic films or selenium layers, for producing a plurality of photographic images in a single exposure to X-rays or similar penetrating rays, and providing for the amplification of the illuminating effect of the penetrating rays on the light sensitive layers in front and/or in back of these light-sensitive layers fluorescent layers (amplification foils) exposed to the action of the penetrating rays.

Arrangements of this kind are for example used in multiple layer exposure processes or for producing duplicate images in X-ray diagnostics.

It is in such arrangements difficult to obtain with the single illumination a uniform illumination of all light sensitive layers and therewith uniform pictures upon uniform development of the light sensitive layers. The light sensitive layers lying remote from the illuminating source receive as a rule less illumination than the preceding layers due to absorption of rays in preceding light sensitive layers, foils and intermediate elements.

There are arrangements known comprising a plurality of successively disposed photographic films in which the films which are increasingly spaced from the illuminating source are, for the purpose of avoiding the above-mentioned drawbacks, coated with foils (fine structure calcium-tungstate; universal or high capacity foils) of increasing amplification power, preferably increasing thickness, the respective foil thickness being thereby determined, for example, by the optimum amplification thereof (see Eggert "Fortschritte auf dem Gebiete der Roentgenstrahlen" 39 (1912), pp. 88–100; Hartmann "Reichsberichte Chemie" (1942), pp. 622–636); or in which there are provided, for the equalization of the illuminating effect, different films depending upon the spacing from the illuminating source; or in which there are disposed between the amplification foils and the photographic films uniformly blackened inserts whose degree of blackening decreases with increasing spacing from the illumination source.

The pictures produced upon the photographic films which are farthest away from the illumination source show in all these known arrangements a considerable lack of sharpness. The reason resides in the fact that the layer of matter which is to be penetrated to reach the last film is in the known arrangements too thick. This however was in the known arrangements necessary for the purpose of sufficient equalization to obtain uniform illumination of the photographic films.

In accordance with the invention, in an arrangement comprising a plurality of successively positioned light sensitive layers for the production of several photographic images in a single illumination by X-rays or similar penetrating rays and with the use of layers associated with the individual light sensitive layers functioning for the amplification of illumination thereof (amplification foils), there is obtained, as compared with the known arrangements, a lessened absorption and a decreased scattering of the penetrating radiation by associating with the amplification foils color layers which weaken the light emanating therefrom and directed toward the light sensitive layers, whereby the color density in these color layers decreases per unit of area from amplification foil to amplification foil with increasing spacing from the radiation source so as to obtain a uniform illumination of the light sensitive layers in said single illumination operation.

In an embodiment of the invention, the amplification foils are in known manner colored in such a way that the degree of coloring thereof decreases from amplification foil to amplification foil with increasing spacing from the radiation source. It has been found that a sufficient equalization of the different illumination of the individual light sensitive layers is possible already with extraordinarily small amounts of pigment additions to the individual foils. For example, addition of a coloring substance known under the trade-name Zaponechtscharlach GG, in amounts from 1 to $12 \cdot 10^{-6}$ g./cm.$^2$ of the foil area, to amplification foils coated with 30 mg./cm.$^2$ calcium tungstate, there is obtained an equalization of illumination of the individual films, such as would otherwise be possible only with a practically not realizable variation of the amount of illumination substance in a ratio of 1/10,000. The maximally required amounts of color are on the order of about $100 \cdot 10^{-6}$ g./cm.$^2$ foil surface. Accordingly, there are amounts of color substance used within the scope of the invention which correspond in order of magnitude to the amounts of known killer and activator substances in the production of fluorescent substances and which therefore do not noticeably absorb or scatter the radiation. The coloring of the foils presents moreover the further advantage of suppressing to a large extent the fluorescent radiation emanating from the fluorescent substances and leaving the foils other than perpendicularly thereto (scattering radiation).

The arrangement of the foils according to the invention does not exclude the advantageous use of further auxiliary measures for equalizing the illumination of the light sensitive layers.

In order to reduce with certainty the absorption of the scattering of the penetrating radiation to a minimum, the invention proposes to color the amplification foils with coloring matter made from elements of low order number. These are primarily organic coloring substances, for example substances known under the trade-names Zaponechtscharlach, Zaponechtgelb CGG, Zaponechtgruen GG, or Auramin, Rhodamin, Nigrosin.

It is not necessary to color all amplification foils with the identical coloring substance; it being indeed suitable to color them with coloring substances of different absorption spectrum, so that their amplification effect relative to the light sensitive layers increases from foil to foil with increasing spacing from the radiation source. The foils made in this manner can be visually distinguished one from the other by their different colors.

The required amounts of color substance additions to the individual fluorescent layers vary between 1 and $100 \cdot 10^{-6}$ g./cm.$^2$.

The coloring of the amplification foils, comprising fluorescent substances consisting of fluorescent crystals, may be carried out by coloring the crystal surfaces or, when using fluorescent substances held together by binders, by coloring the binder means.

The colored amplification foils are most simply produced by mixing the coloring and fluorescent substances in a diluent, admixing therewith the film-forming substance, and processing the resulting mixture to form the amplification foils. The fluorescent substance may be added to the diluent before or after the addition of the coloring matter. The diluent may be a solution of a binder for fluorescent substances. The diluent may also operate as a solvent, and the fluorescent substances are added thereto in suspended or powderized form.

A further reduction of the absorption and scattering of the penetrating radiation is obtained by the arrangement according to the invention by coating the major part of the amplification foils with fluorescent substances in amounts per area thereof which are considerably less than would be required for optimum amplification effects (thin layer amplification foils); the reduced amplification effect, due to reduced amounts of fluorescent substance in the individual foils, is practically negligible as compared with the advantage of reduced scattering and reduced absorption of the penetrating radiation. The number of light sensitive layers which may be simultaneously uniformly exposed is by this procedure moreover considerably increased and the arrangement is made less sensitive to the energy of the penetrating radiation.

The thin layer amplification foils preferably to be used are those which are coated with 30 mg. and less of fluorescent substance per cm.$^2$. In order to simplify the production of these foils, it is to be recommended to coat them with identical amounts of fluorescent substance per unit area. However, the foils remotest from the radiation source may for better utilization of the radiation be coated with greater amounts of fluorescent substance.

The amplification foils according to the invention are, depending upon the desired amplification effect, disposed either on both sides of the light sensitive layers or at the side of the light sensitive layers facing away from the radiation source.

In order to obtain upon the light sensitive layers pictures which are as sharp as possible, only such films are advantageously used, in employing photographic films as light sensitive layers, which are coated with light sensitive material exclusively on the sides thereof which face the amplification foils.

The absorption and scattering of the penetrating radiation in the amplification foils can additionally be reduced by coating them with fluorescent substances made from elements of low order number, for example, zinc sulphides which are in known manner activated. Since the low energy components of the radiation are preferentially absorbed with increasing spacing from the radiation source, the mean energy of the radiation therefore becoming greater from foil to foil with increasing spacing from the radiation source, it is in some cases, for example, when using low energy X-ray radiation for the illumination of the light sensitive layers, of advantage, to use in the last amplification foils fluorescent substances made from elements of high order number, for example, calcium-tungstate or barium lead sulphate. These fluorescent substances also absorb a considerable part of the high energy radiation and thereby increase the energy yield of the arrangement according to the invention.

It may furthermore be suitable, for the equalizing of the illumination of the light sensitive layers by the penetrating radiation, for example, in the use of foils with identical amplification effect, to employ light sensitive layers whose sensitivity, as compared with the fluorescent light of the amplification foils, increases from foil to foil with increased spacing from the radiation source. It is in the use of photographic films, as light sensitive layers, of advantage to provide such photographic films in known manner with halation protection means.

Figure 2:
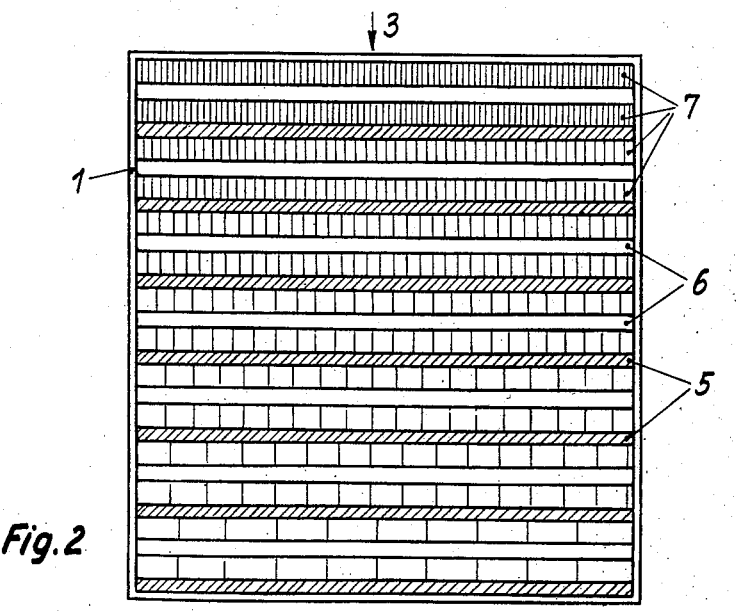
Figure 3:
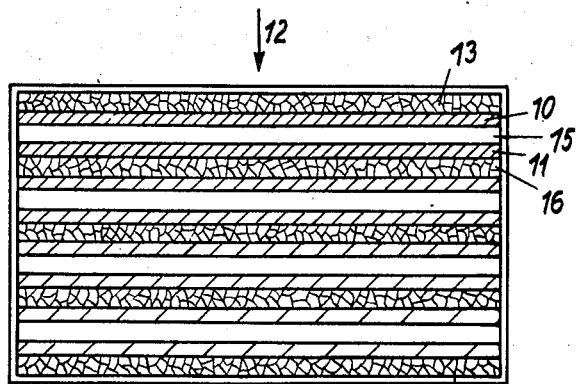
Figure 4:
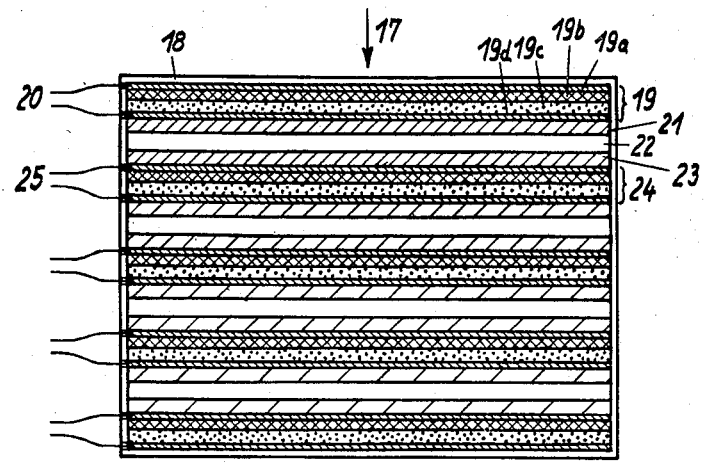

The foregoing and further objects and features will appear from the description which is rendered below with reference to the accompanying diagrammatic drawings, in which:

Fig. 1 shows an embodiment of the invention;
Fig. 2 shows another embodiment;
Fig. 3 illustrates an example of a four layer arrangement; and
Fig. 4 shows an embodiment employing electro-luminescent picture modifying layers constituting amplification foils.

Identical parts are in Figs. 1 and 2 identically referenced.

Referring now to Fig. 1, numeral 1 indicates a plate holder in which are arranged ten individual foils 2, one above the other. A photographic film 4 is disposed on the side of each foil 2 which faces toward the ray entry direction 3. A layer of balsa wood is for spacing purposes inserted between the successive respectively associated films and foils. The first nine foils, counting in the ray entry direction 3, are coated with 30 mg./cm.$^2$ calcium-tungstate and the tenth foil is coated with 40 mg./cm.$^2$ calcium-tungstate. The additions of coloring matter in these foils, considered again in the sequence of the direction of the rays 3, amount to —9.56/5.75/3.3/2.1/1.4/1.0/0.4/
0.25/0.0·10$^{-6}$ g./cm.$^2$ Zaponechtscharlach CG Inserts made from foamy artificial material may be used in place of the balsa wood members. The arrangement according to Fig. 1 is matched for illumination by X-ray radiation from a four-valve X-ray apparatus with 90 kv. tube voltage.

In the arrangement according to the invention as shown in Fig. 2, amplification foils 7 are disposed on each side of each film 6. The last two amplification foils are coated with 50 mg./cm.$^2$ calcium-tungstate, and the others are coated with 30 mg./cm.$^2$ calcium-tungstate. The coloring of the foils, considered again in the ray entry direction 3 amounts respectively to 11.9/11.9/5.75/5.75/3.3/3.3/1.41/1.41/0.605/0.065/
0.15/0.15/0.0/0.0 Zaponechtscharlach CG per cm.$^2$ of foil area. This arrangement is likewise matched for illumination by X-rays produced by a four-valve X-ray apparatus with 90 kv. tube voltage.

The arrangement above described requires special commercially unavailable amplification foils. This is according to the invention avoided by the provision of an arrangement comprising a plurality of successively disposed light sensitive layers for producing several photographic images in a single illumination by X-rays or similarly penetrating rays, with the use of amplification foils respectively associated with the individual light sensitive layers, such arrangement being characterized by the use of uniformly colored filters inserted between the amplification foils and the light sensitive foils, such filters being partially permeable to the light from the amplification foils, the pass degree for the light from the amplification foils increasing from filter to filter with increasing spacing from the ray source for the penetrating radiation. The light sensitive layer disposed remotest from the radiation source does not have a filter associated therewith; it serves suitably as a base for the matching of the filter with regard to the color density thereof.

These colored filters offer, as compared with the above-described colored amplification foils, the further advantage of being easily exchangeable, therefore permitting, with given light sensitive layers and amplification foils, adjustment of the arrangement for different hardness of the penetrating radiation merely by exchange of the individual filters so as to obtain always uniform illumination of the light sensitive layers. The arrangement also has the advantage of giving the possibility to change by suitable choice of the filter coloring the contrast of the pictures upon the light sensitive layers.

It is known, in an arrangement similar to one of the arrangements of the invention and using amplification foils with relatively high content of illuminating substance, to employ uniformly illuminated photographic films instead of colored filters. The use of these films is in many respects disadvantageous; for example, the silver bromide crystals in the films strongly scatter the light emitted from the amplification foils and therefore diminish the sharpness of the pictures produced upon the light sensitive layers. The filters according to the invention are free of this drawback as they are according to the invention uniformly colored, that is, containing the coloring matter approximately molecularly dissolved but not colloidally dispersed or in powdered form.

Coloring substances are embedded in the filters according to the invention, which absorb the light from the amplification foils qualitatively differently. It is possible, by suitable selection of these coloring substances, to affect the light from the amplification foils differently in different spectral ranges, thereby achieving an equalization of the illumination of the light sensitive layers and moreover excluding the possibility of erroneous identification of the filters.

Similar possibilities result from another embodiment wherein the individual filters are colored with the identical coloring matter, with amounts of coloring matter embedded therein which absorb quantitatively differently the light emitted from the amplification foils.

It is oftentimes unnecessary to associate color filters with the light sensitive layers disposed farthest away from the radiation source. The arrangement according to the invention is thereby simplified and avoids even the slight scatter losses of the penetrating rays occurring in these filters.

Commercially available amplification foils may be used in simplest embodiments of the invention. These amplification foils need not be different one from the other; they may be coated with layers of the identical illuminating substance in identical amounts per unit of area.

A particularly great number of light sensitive layers may be uniformly exposed by the use of amplification foils containing 40 mg. illuminating substance and less.

If it is desired to obtain particularly fine equalization in the exposure of light sensitive layers, colored amplification foils may be used in addition to the color filters.

Electrical charges—caused for example by the penetrating radiation or by separation from the pouring base or by friction—occasionally accumulate upon the filter surfaces giving rise to discharges which affect the illumination of the light sensitive layers. In accordance with a feature of the invention, the filters are provided with means for suppressing such static accumulation of electrical charges. Known so-called "anti-static softeners" provided in the filter substances may be used for this purpose, or the surfaces of the filters may be treated with known "anti-static means." The surfaces of the filters may for this purpose also be provided with extremely thin metallic coatings.

The arrangement according to the invention uses as light sensitive layers primarily photographic films or paper which are sensitive for preferred spectral ranges of the visible or invisible light. The use of known phototropic substances may be advantageous in the production of X-ray pictures which are to be viewed after the lapse of a certain time interval on account of their recognized advantages.

As already explained, commercially available amplification foils are used as a rule; however, in order to obtain a stronger illumination of the light sensitive layers, known planiform picture modifiers may be used in their place, for example, the electroluminescent picture modifier described in the British Patent No. 713,916.

The colored filters are producers from a transparent artificial material, for example, cellulose derivative or hardened gelatine, by pouring upon a base a plastic film-forming solution of artificial material containing coloring substance and separating the solidified layer from such base.

In accordance with another feature of the invention, the filters may be produced by cutting layers from a colored block polymerization product; if desired, the layers may be rolled and polished.

Two examples are noted below for an arrangement according to the invention, one for a four layer and another for a seven layer colored filter.

In the four layer filter, there are used four amplification foils each coated on both sides with a content of illuminating substance of 40 mg./cm.$^2$ calcium-tungstate. A complete illumination equalization is obtained with 90 kv. X-ray irradiation by the use of coloring substances in amounts as follows:

Filter 1_____17$\gamma$ gr./cm.$^2$ Zaponechtgelb CG
Filter 2_____10$\gamma$ gr./cm.$^2$ Zaponechtgelb CG
Filter 3_____5.5$\gamma$ gr./cm.$^2$ Zaponechtgelb CG
Filter 4_____0$\gamma$ gr./cm.$^2$ Zaponechtgelb CG For 70 kv. X-ray radiation, the amounts of coloring substances will be:

Filter 1_____25$\gamma$ gr./cm.$^2$ Zaponechtgelb CG
Filter 2_____14$\gamma$ gr./cm.$^2$ Zaponechtgelb CG
Filter 3_____6.5$\gamma$ gr./cm.$^2$ Zaponechtgelb CG
Filter 4_____0$\gamma$ gr./cm.$^2$ Zaponechtgelb CG Fig. 3 shows an example of such a four layer arrangement. Numeral 14 indicates a plate holder and 12 the direction of radiation from a radiation source. Arranged in the plate holder are, as seen in the direction of radiation, a first layer comprising an amplification foil 13, a color filter 10, a photographic film 15, another color filter 11, and a further foil 16, followed by three additional successively arranged layers comprising similar parts. In accordance with the foregoing explanations, the filters 10 and 11 contain, for 90 kv. X-ray radiation, 17$\gamma$ gr. Zaponechtgelb CG/cm.$^2$, and the further successively disposed filters, respectively associated with other films contain in pairs 10 gr., 5.5 gr. and 0 gr. Zaponechtgelb CG/cm.$^2$.

In a seven layer arrangement, there are used seven amplification foils each coated on both sides with a fluorescent content of 30 mg./cm.$^2$ calcium tungstate, resulting with 90 kv. X-ray radiation in complete illumination equalization when using filters containing amounts of coloring substance as follows:

Filter 1_____29$\gamma$ gr./cm.$^2$ Zaponechtgelb CG
Filter 2_____23$\gamma$ gr./cm.$^2$ Zaponechtgelb CG
Filter 3_____17.5$\gamma$ gr./cm.$^2$ Zaponechtgelb CG
Filter 4_____10.5$\gamma$ gr./cm.$^2$ Zaponechtgelb CG
Filter 5_____4.5$\gamma$ gr./cm.$^2$ Zaponechtgelb CG
Filter 6_____2.5$\gamma$ gr./cm.$^2$ Zaponechtgelb CG
Filter 7_____0$\gamma$ gr./cm.$^2$ Zaponechtgelb CG With an X-ray radiation of 70 kv., there is obtained a complete illumination equalization when using filters containing amounts of coloring substances as follows:

Filter 1_____43$\gamma$ gr./cm.$^2$ Zaponechtgelb CG
Filter 2_____34.5$\gamma$ gr./cm.$^2$ Zaponechtgelb CG
Filter 3_____25$\gamma$ gr./cm.$^2$ Zaponechtgelb CG
Filter 4_____17.5$\gamma$ gr./cm.$^2$ Zaponechtgelb CG
Filter 5_____10$\gamma$ gr./cm.$^2$ Zaponechtgelb CG
Filter 6_____5$\gamma$ gr./cm.$^2$ Zaponechtgelb CG
Filter 7_____0$\gamma$ gr./cm.$^2$ Zaponechtgelb CG Fig. 4 shows a further embodiment of the invention which is similar to Fig. 3 employing, however, electroluminescent picture modifying layers.

Numeral 18 in Fig. 4 indicates the plate holder containing, as seen in the direction of radiation 17, an electroluminescent picture modifier 19, a color filter 21, a photographic film 22, and a further color filter 23, followed again by an electro-luminescent picture modifier 24. This arrangement of parts is repeated four times, that is, there are, as in Fig. 3, a plurality of photographic films, four films 22 being shown to give an example, and on each side of each film is a color filter 21, 23, followed respectively by an electro-luminescent picture modifiers 19 and 24. The electro-luminescent picture modifiers accordingly take the place of the amplification foils 13 and 16 of Fig. 3.

The degree of coloring of the color filters 21, 23 decreases with increasing spacing from the radiation source 17, as is indicated by the different shading. Similar conditions obtain with respect to the color filters 10, 11 in Fig. 3.

Each luminescent picture modifier, such as the modifiers 19, 24 comprises transparent conductive layers 19a, 19d, a semiconducting layer 19b, and a fluorescent layer 19c. The layers 19a and 19d constitute electrodes provided with terminals as indicated at 20, 25 which extend from the holder 18 in insulated relationship.

Changes may be made within the scope and spirit of the appended claims.

I claim:

1. An arrangement for producing a plurality of photographic images in one exposure to penetrating rays emanating from a radiation source, comprising a plurality of successively disposed light sensitive layers, amplification foils containing fluorescent substances respectively disposed with respect to the individual light sensitive layers so as to effect amplification of the exposure illumination thereof, color substances for each of said amplification foils, said color substances being operative to weaken the light emanating from said amplification foils in the direction of said light sensitive layers, the color density in said color substances per unit area thereof diminishing from amplification foil to amplification foil with increasing spacing from said radiation source for the purpose of obtaining in said one exposure uniform illumination of said light sensitive layers and thereby identical images responsive to identical development of said light sensitive layers.

2. An arrangement according to claim 1, wherein said amplification foils are colored, the degree of coloring diminishing from amplification foil to amplification foil with increasing spacing from said radiation source.

3. An arrangement according to claim 2, comprising amplification foils containing color substances of respectively different absorption spectra so that the absorption effect thereof relative to said light sensitive layers decreases from foil to foil with increasing spacing from said radiation source.

4. An arrangement according to claim 2, comprising amplification foils containing color matter in amounts from $10^{-6}$ to $10^{-4}$ g./cm.$^2$ of foil area, the degree of coloring decreasing from foil to foil with increasing spacing from said radiation source.

5. An arrangement according to claim 2, comprising amplification foils containing fluorescent crystals, the surfaces of said crystals being colored, the degree of coloring decreasing from foil to foil with increasing spacing from said radiation source.

6. An arrangement according to claim 2, comprising amplification foils containing fluorescent substances held together by binding means, said binding means being colored, the degree of coloring decreasing from foil to foil with increasing spacing from said radiation source.

7. An arrangement according to claim 1, wherein the preponderant part of said amplification foils contains per unit area amounts of fluorescent substance considerably smaller than the amount of fluorescent substance at which the amplification effect resulting therefrom would be at given radiation at a maximum.

8. An arrangement according to claim 7, comprising amplification foils containing color substances of respectively different absorption spectra so that the absorption effect thereof relative to said light sensitive layers decreases from foil to foil with increasing spacing from said radiation source.

9. An arrangement according to claim 7, comprising amplification foils containing fluorescent substances made from elements of an order number which increases from foil to foil with increasing spacing from said radiation source.

10. An arrangement according to claim 2, comprising amplification foils containing fluorescent substances made from elements of an order number which increases from foil to foil with increasing spacing from said radiation source.

11. An arrangement according to claim 2, wherein said amplification foils are colored by admixing fluorescent material and coloring matter in a suitable diluent and processing the corresponding mixture to form said amplification foils, the degree of coloring decreasing from foil to foil with increasing spacing from said radiation source.

12. An arrangement according to claim 1, comprising filter means inserted between said amplification foils and said light sensitive layers, said filter means being uniformly colored and partially permeable to the light emanating from said amplification foils, the pass degree for the light emanating from said amplification foils increasing from filter means to filter means with increasing spacing from said radiation source.

13. An arrangement according to claim 12, comprising color substances embedded in said filter means, said color substances being operative to effect different absorption of the light emanating from said amplification foils.

14. An arrangement according to claim 12, wherein said filters are identically colored, amounts of color substances being embedded in said filters which are operative to effect different absorption of the light emanating from said fluorescent layers.

15. An arrangement according to claim 7, comprising amplification foils containing fluorescent substance in amounts up to 40 mg./cm.$^2$.

16. An arrangement according to claim 12, comprising means for suppressing accumulation of static electrical charges on said filters.

17. An arrangement according to claim 1, comprising electroluminescent picture modifying layers constituting said amplifier foils.

18. An arrangement according to claim 12, comprising color filters allotted only to light sensitive layers which are disposed nearest to said radiation source.

19. An arrangement according to claim 12, comprising amplification foils containing color substances of respectively different absorption spectra so that the absorption effect thereof relative to said light sensitive layers decreases from foil to foil with increasing spacing from said radiation source.

20. An arrangement according to claim 12, comprising amplification foils containing fluorescent substances made from elements of an order number which increases from foil to foil with increasing spacing from said radiation source.

21. An arrangement according to claim 17, comprising amplification foils containing coloring substances of respectively different absorption spectra so that the absorption effect thereof relative to said light sensitive layers decreases from foil to foil with increasing spacing from said radiation source.

No references cited.